(12) United States Patent
Chu

(10) Patent No.: US 7,687,702 B2
(45) Date of Patent: Mar. 30, 2010

(54) SYSTEM AND METHOD FOR TEACHING MUSIC

(76) Inventor: Lucy Chu, 3553 Olentangy Blvd., Columbus, OH (US) 43214

(*) Notice: Subject to any disclaimer, the term of this patent is extended or adjusted under 35 U.S.C. 154(b) by 0 days.

(21) Appl. No.: 12/183,589

(22) Filed: Jul. 31, 2008

(65) Prior Publication Data

US 2009/0031880 A1    Feb. 5, 2009

Related U.S. Application Data

(60) Provisional application No. 60/953,018, filed on Jul. 31, 2007.

(51) Int. Cl.
*G09B 15/02* (2006.01)
(52) U.S. Cl. ........................ 84/476; 84/470 R
(58) Field of Classification Search ............ 84/476, 84/470 R, 477 R
See application file for complete search history.

(56) References Cited

U.S. PATENT DOCUMENTS

| 4,069,735 | A | 1/1978 | Bertram |
| 4,960,029 | A | 10/1990 | Nelson |
| D410,972 | S | 6/1999 | Soska, Jr. et al. |
| 6,031,172 | A * | 2/2000 | Papadopoulos ........... 84/470 R |
| 6,175,069 | B1 | 1/2001 | Longacre |
| 6,331,668 | B1 | 12/2001 | Michero |
| 6,632,991 | B2 | 10/2003 | Chen |
| 6,967,274 | B2 | 11/2005 | Hanington |
| 7,241,945 | B1 | 7/2007 | Egan |
| 7,396,988 | B1 * | 7/2008 | Rowe ..................... 84/476 |
| 2005/0022653 | A1 | 2/2005 | Hanington |
| 2008/0141849 | A1 * | 6/2008 | Johnston ................. 84/483.2 |

* cited by examiner

*Primary Examiner*—Jianchun Qin
(74) *Attorney, Agent, or Firm*—Standley Law Group LLP

(57) ABSTRACT

A system for teaching music and an associated method of teaching music. The system and method for teaching music use multiple bodies that are each associated with a unique letter that corresponds to the letters A through G from the Latin alphabet and each body has a natural music notes on at least the top or bottom face and an accidental music note of the same letter on at least the front or back face.

7 Claims, 2 Drawing Sheets

SYSTEM AND METHOD FOR TEACHING MUSIC

CROSS-REFERENCE TO RELATED APPLICATIONS

This application claims priority of U.S. provisional application Ser. No. 60/953,018, filed Jul. 31, 2007, the disclosure of which is incorporated herein by reference as if fully recited herein.

TECHNICAL FIELD

The present invention relates to the field of a system and method for teaching music. More particularly, the present invention is a system and method for teaching music using multiple bodies that are each associated with a unique letter that corresponds to the letters A through G and each body that represents a natural music note on at least the top or bottom face and an accidental music note of the same letter on at least the front or back face.

BACKGROUND OF THE INVENTION

Musical scales, chords and other musical basics are typically taught through instructional textbooks or similar devices and methods. Many times, music students cannot easily relate with these instructional textbooks. Textbooks typically use musical staffs to teach students music theory and how to play individual instruments. Generally, students learn scales, chords, and other music basics by memorization and repetition of those basics on corresponding individual instruments.

Ultimately, this may produce a disconnect between the students understanding scales while using multiple different individual instruments. Many times, students will be able to understand and play the various scales, chords, etc. on one instrument, but ultimately will not be able to correlate those same scales, chords, etc. with another instrument.

Furthermore, frequently most instructional textbooks do not provide a means for students to physically interact when learning scales, chords and other music basics. Oftentimes, music basics are taught to students in formats that are confusing and not easily understandable. Routinely, textbooks use a music staff to teach students scales, chords, etc. or textbooks use other charts such as the circle of fifths to show relationships betweens scales, chords and key signatures.

Nevertheless, not all students are able to learn musical scales and chords in a visual sense with no physical interaction. Many times, students may need some form of physical stimuli to facilitate the learning process. Consequently, there is a need for a new system and method for learning musical scales and chords. Preferably, the system and method of learning musical scales and chords utilizes physical stimuli in the learning process. It is preferred that that system and method makes learning fun and easy by reinforcing the basics of musical scales and chords beyond the printed page. Preferably, the musical system and method saves students time and energy when learning musical scales, chords, sight reading, intervals, key signatures and other musical basics.

SUMMARY OF THE INVENTION

This and other advantages are provided by exemplary embodiments of the system and method for teaching musical basics. Typically, the system and method includes seven bodies that are substantially cube-shaped. Each body has a top and bottom face, a front and back face and a left and right side face. Additionally, each body is associated with a unique letter that corresponds to the letters A through G from the Latin alphabet.

Usually, each body has a natural music notes on at least the top or bottom face and an accidental music note of the same letter on at least the front or back face.

In some embodiments, each body has a means for releasably securing another body that is located on the side faces of each body.

In some embodiments, each body has a natural music note on both the top and bottom face, and a sharp music note of the same letter on the front face and a flat music note of the same letter on the back face.

A system of the present invention may be employed by a user to learn musical scales, chords, sight reading, intervals, key signatures, and other musical basics.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF A PREFERRED EMBODIMENT

Figure 1:
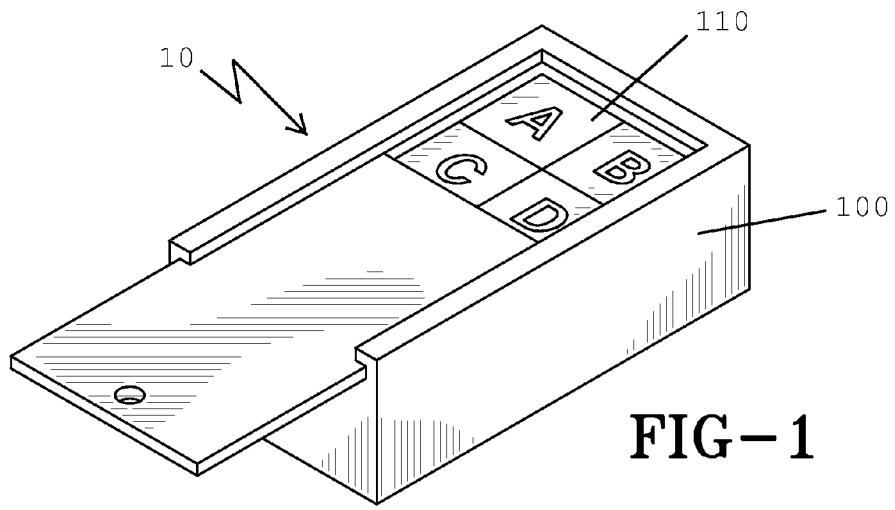
FIG. 1 is a perspective view illustrating one exemplary embodiment of the present invention where the bodies are situated in a carrying case.
Figure 2:
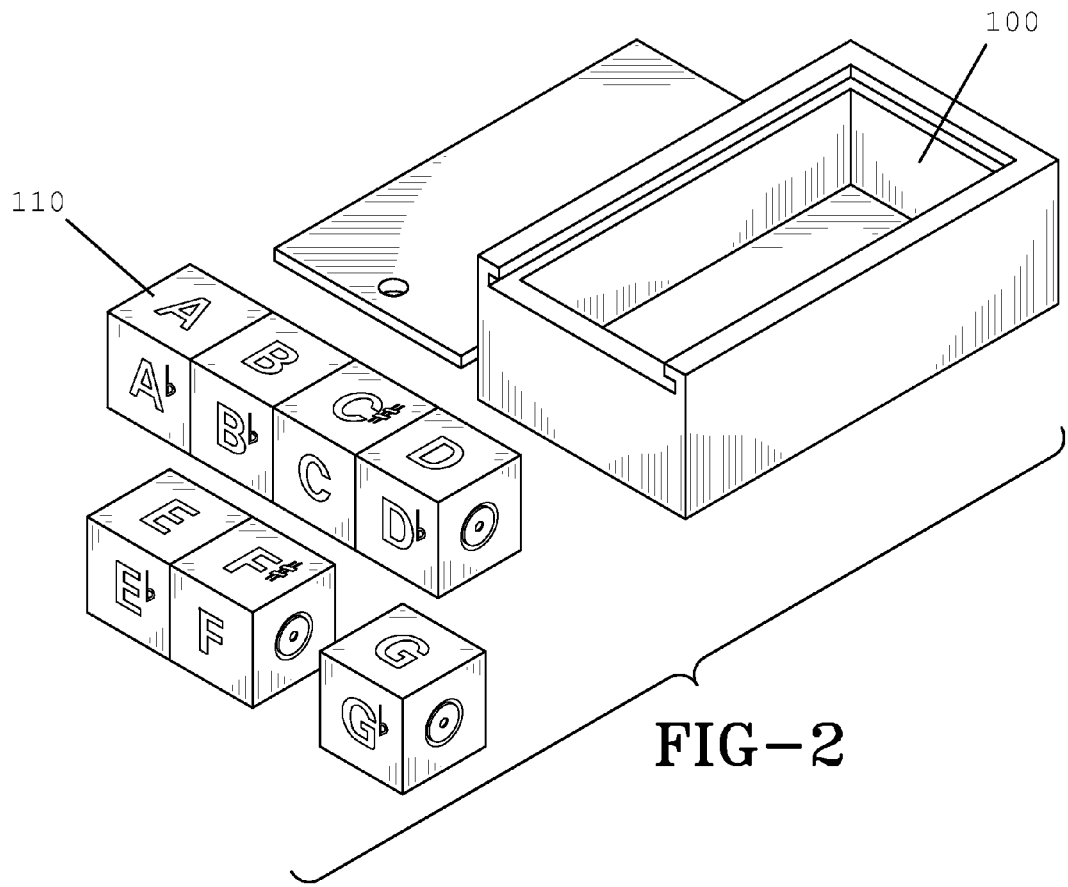
FIG. 2 illustrates the exemplary embodiment of FIG. 1 with the bodies situated outside of the carrying case.

In an exemplary embodiment of the invention, bodies are provided for use with a system and method for learning music basics. As shown in FIGS. 1 and 2, such a system 10 may comprise a carrying case 100 and seven bodies 110. In whatever form, the system 10 may include a carrying case 100 that is designed to house all seven bodies 110 within the case. For example, the illustrated embodiment of FIGS. 1 and 2 show the carrying case 100 that includes a box that has an opening on one face. The box has grooves located towards the opening that are adapted to receive a sliding member. This embodiment of the carrying case 100 is designed so that the box releasably retains the sliding member by frictional force to secure the bodies inside the box. Other exemplary embodiments of the box and sliding member may include any number of fastening means that facilitate the releasable retention of the sliding member with the box. Preferably, the box does not allow significant movement of the bodies 110 within the box once the sliding member is fully engaged to reduce the likelihood of damage to the bodies 110. Other exemplary embodiments of the system 10 may use any number of forms and varieties of carrying cases 100 that are able to adequately house the bodies 110 within them for transportation.

FIG. 2 illustrates the seven bodies 110 included in exemplary embodiments of the system 10. In this particular embodiment, each of the seven bodies 110 is substantially cube-shaped. However, in other embodiments, the bodies 110 may be any number of geometries. Furthermore, each body 110 is associated with a unique letter that corresponds to the letters A through G of the Latin alphabet that represents a natural music note. However, in other exemplary embodiments, the letters used for the music notes may be from any other alphabet. The bodies 110 may be made of any one or combination of materials, such as, for example, wood, fiberglass, plastics or metals. Preferably, the bodies 110 are wear resistant and resistant to other weather conditions to promote longer use.

Figures 3A, 3B:
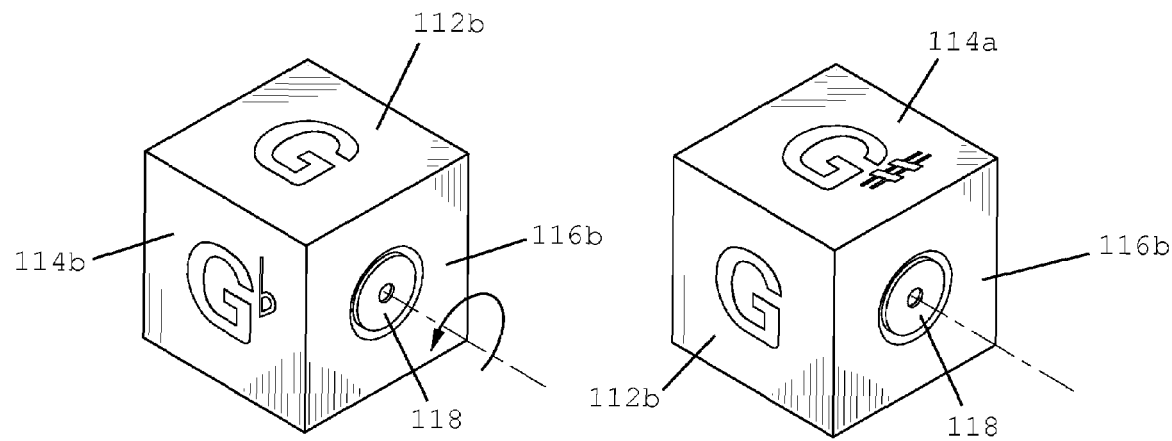
FIG. 3a is an enlarged view of one exemplary embodiment of a body of the system with an axis that passes through the side faces of the body.
FIG. 3b illustrates the exemplary embodiment of FIG. 3a with the body rotated ninety degrees around the axis that passes through the side faces of the body.

FIGS. 3a and 3b show an enlarged view of an exemplary body 110 that contains a top and bottom face 112a and 112b, a front and back face, 114a and 114b and a left and right side face 116a and 116b. Each body 110 includes at least one natural music note that is located on at least the top or bottom face 112a and 112b, and an accidental music note of the same letter that is located on the front or back face 114a and 114b of each body 110. In this particular embodiment, a natural music note is located on the top and bottom face 112a and 112b of each body 110. Furthermore, a sharp music note of the same letter is located on the front face 114a of each body 110, while a flat music note of the same letter is located on the back face 114b of each body.

Preferably, but not necessarily, the natural, sharp and flat music notes are situated on each body 110 in a manner that when the body 110 is rotated on an axis that passes through the middle of the each side face 116a and 116b, the music notes are positioned facing the same direction when each side the body 110 is positioned vertically upward throughout the rotation of the body 110. Additionally, in this particular embodiment the natural music notes are colored black, the sharp music notes are colored red, and the flat music notes are colored blue. In other exemplary embodiments, the different music notes may be any number of combination of colors. Also, other exemplary embodiments may use different fonts or styles of font for each of the different music notes. In this particular embodiment, the notes are painted onto the bodies 110. However, in other exemplary embodiments, the notes may be an integral part of the body 110, such as, but not limited to a raised portion of a face. Also, other means for applying a note to the faces of the bodies 110 may be used and are anticipated by the present invention.

Figure 4:
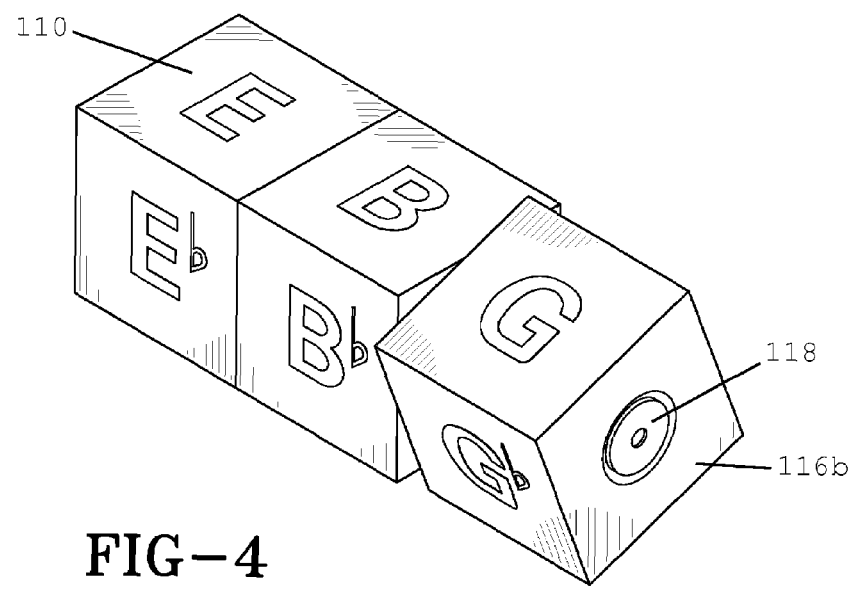
FIG. 4 depicts a perspective view of three bodies of the system that are releasably secured to one another, where one body is slightly rotated when compared to the other two bodies.

In the embodiment illustrated in FIGS. 3a and 4, each of the bodies 110 includes a magnet 118 on each of the side faces 116a and 116b to releasably secure to other bodies. In this particular embodiment, each of the side faces has an aperture that is adapted to retain a magnet 118 that is secured at least partially within the aperture by an adhesive. However, in other embodiments, the magnets 118 may be secured directly to the side faces that do not have an aperture for receiving the magnet 118. In order for the magnets 118 to properly releasably secure the bodies 110, the magnets 118 on the left side face 116a are polarized opposite the magnets 118 of the right side face 116b on each body 110. If like poles are placed beside one another, the magnetic force between the like poles will not allow the bodies 110 to releasably secure to one another. Thus, the magnets 118 may facilitate proper alignment of the bodies 110 by not allowing a body 110 to face the wrong direction when placing the bodies 110 into the sequence.

Preferably, the magnets 118 used produce a force sufficient enough to secure the bodies 110 during the use of the system 10. It is also preferred that the magnets 118 allow the bodies 110 to rotate in relation to one another without the sequence of bodies separating while the user is exercising the system 10. It is preferred that the magnets are located in the middle of the each side face. However, depending upon the type of magnet used, the magnet may be situated at any point towards the side face that allows proper function of the bodies 110 during use.

In other embodiments, the bodies 110 may include alternative means for releasably securing the bodies. For example, a snap and lock system may be used to secure the bodies. In this system, one side face of each body 110 include a protrusion and the other side face of each body includes a body adapted to receive the protrusion. The snap and lock system would allow the bodies to releasably secure to one another and allow the first body to rotate in relation to the second body. Additionally, the snap and lock system would facilitate the proper alignment of the bodies 110 as aforementioned above. In another embodiment, the system 10 may use a device such that trademarked under the name Velcro. In another example, an aperture may be extended between the left and right side faces 116a and 116b of each body 110 to allow a securing body, such as a rod, to protrude through the bodies 110. Other exemplary embodiments may use alternative means for releasably securing the bodies to one another and these alternative means are anticipated by the present invention.

In operation, the seven bodies 110 of the system each represent a tone in a musical scale. As explained above, the bodies 110 may be releasably secured to one another. In order to learn different types of musical scales, chords, etc., a user will arrange the bodies 110 sequentially to represent, on the top face 112a of the bodies 110, the sequential tones in a known major musical scale. When the user has correctly arranged the bodies, one of two scenarios will be true. First, if the known musical scale contains sharps, then each body is aligned such that each natural tone shown on a top face has the corresponding flat tone on the front face and each sharp tone shown on a top face has the corresponding natural tone on the front face. Or conversely, if the known musical scale contains flats, then each body is aligned such that each natural tone shown on a top face has the corresponding flat tone on the front face and each flat tone shown on a top face has the corresponding natural tone on the front face.

Whenever a user is moving the bodies of the system, after moving the bodies, the bodies are must stay sequential alphabetical order in a cyclical manner. Since the bodies are lettered A through G, once the letter G is reached in the sequence, the sequence starts over with the use of the body that contains the letter A if all seven bodies have not been used.

Once the bodies are properly positioned in a known major musical scale, the user may move to the next higher major scale of sharps by first moving the first four bodies of the sequence behind the remaining three bodies while maintaining the same orientation of the bodies. Second, the user rotates the body located at the end of the sequence ninety degrees towards the user. Correspondingly, the next lower major scale of sharps may be shown by performing the two aforementioned steps in reverse. An example of this method is when the user starts with the C major scale, sequencing the bodies as: C, D, E, F, G, A and B. After the user performs the two aforementioned steps, the bodies will be situated in the next higher scale, the G major scale, that sequences the bodies as G, A, B, C, D, E, and F#.

Once the bodies are properly positioned in a known major musical scale, the user may move to the next higher major scale of flats by first rotating the body located at the end of the sequence ninety degrees away from the user. Second, the user moves the last four bodies of the sequence in front of the remaining three bodies, maintaining the same orientation of the bodies during the second movement. Correspondingly, the next lower major scale of flats may be shown by performing the two aforementioned steps in reverse.

For a user to learn the minor scales of sharps, the user must first have the bodies in the proper aforementioned position of a known major musical scale. Next, for the user to move to the next higher scale, the user moves the first four bodies of the sequence, maintaining the same orientation of the bodies, behind the remaining three bodies. Subsequently, the user rotates the second body in the sequence ninety degrees towards the user. Last, the user rotates the last body in the sequence ninety degrees towards the user. Correspondingly, the next lower minor scale of sharps may be shown by performing the two aforementioned steps in reverse.

For a user to learn the minor scales of flats, the user must first have the bodies in the proper aforementioned position of a known major musical scale. Next, for the user to move to the next higher scale, the user moves the last four bodies of the sequence in front of the remaining three bodies, maintaining the same orientation of the bodies. Then, the user rotates the next to last body of the sequence ninety degrees away from the user. Last, the user rotates the last body of the sequence ninety degrees towards the user. Correspondingly, the next lower minor scale of flats may be shown by performing the two aforementioned steps in reverse.

In one method, a user may learn the relative keys where the major key and the minor key have the same key signature. First, the user must first have the bodies in the proper aforementioned position of a known major musical scale. Next, the user moves the last two bodies of the sequence, maintaining the same orientation of the bodies, in front of the remaining five bodies.

In another operation, the user may learn the parallel keys where the scales start on the same note but do not share the same key signature. Here, the user must first have the bodies in the proper aforementioned position of a known major musical scale. Next, the user rotates the third and sixth bodies of the sequence ninety degrees away from the user.

In other operations, the bodies may be used to teach students various other aspects that relate to music, including, but not limited to: triads, inversions, major perfect intervals and minor perfect intervals.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method for teaching musical scales, comprising the steps of:
   providing a system for teaching musical scales, the system comprising:
   seven bodies that are substantially cube-shaped, each with a top and bottom face, a front and back face, and a left and right side face, each body is associated with a unique letter that corresponds to the letters A through G that represent a natural music note that is located on at least the top or bottom face of the body, and an accidental music note of the same letter on at least the front or back face of each body, wherein each body represents a tone in a musical scale; and
   arranging the bodies sequentially to represent, on a top face of the bodies, the sequential tones in a known major musical scale, such that:
   if the known musical scale contains sharps, then each body is aligned such that each natural tone shown on a top face has the corresponding flat tone on the front face and each sharp tone shown on a top face has the corresponding natural tone on the front face; and
   if the known musical scale contains flats, then each body is aligned such that each natural tone shown on a top face has the corresponding flat tone on the front face and each flat tone shown on a top face has the corresponding natural tone on the front face.

2. The method of claim 1, further comprising the steps of: moving to the next higher major scale of sharps by the steps of:
   moving the first four bodies of the sequence behind the remaining three bodies, maintaining the same orientation of the bodies, after moving the bodies, the bodies are must stay sequential alphabetical order in a cyclical manner, lettered A through G, once the letter G is reached in the sequence, the sequence starts over with the use of the body that contains the letter A if all seven bodies have not been used; and
   rotating the body located at the end of the sequence ninety degrees towards the user.

3. The method of claim 1, further comprising the steps of: moving to the next higher major scale of flats by the steps of:
   rotating the body located at the end of the sequence ninety degrees away from the user; and
   moving the last four bodies of the sequence in front of the remaining three bodies, maintaining the same orientation of the bodies, after moving the bodies, the bodies are must stay sequential alphabetical order in a cyclical manner, lettered A through G, once the letter G is reached in the sequence, the sequence starts over with the use of the body that contains the letter A if all seven bodies have not been used.

4. The method of claim 1, further comprising the steps of: moving to the next higher minor scale of sharps by the steps of:
   moving the first four bodies of the sequence behind the remaining three bodies, maintaining the same orientation of the bodies, after moving the bodies, the bodies are must stay sequential alphabetical order in a cyclical manner, lettered A through G, once the letter G is reached in the sequence, the sequence starts over with the use of the body that contains the letter A if all seven bodies have not been used;
   rotating the second body in the sequence ninety degrees towards the user; and
   rotating the last body in the sequence ninety degrees towards the user.

5. The method of claim 1, further comprising the steps of: moving to the next higher minor scale of flats by the steps of:
   moving the last four bodies of the sequence in front of the remaining three bodies, maintaining the same orientation of the bodies, after moving the bodies, the bodies are must stay sequential alphabetical order in a cyclical manner, lettered A through G, once the letter G is reached in the sequence, the sequence starts over with the use of the body that contains the letter A if all seven bodies have not been used;

rotating the next to last body of the sequence ninety degrees away from the user; and rotating the last body of the sequence ninety degrees towards the user.

6. The method of claim 1, further comprising the steps of:

moving to the minor natural key with the same key-signature by the steps of:

moving the last two bodies of the sequence in front of the remaining five bodies, maintaining the same orientation of the bodies, after moving the bodies, the bodies are must stay sequential alphabetical order in a cyclical manner, lettered A through G, once the letter G is reached in the sequence, the sequence starts over with the use of the body that contains the letter A if all seven bodies have not been used.

7. The method of claim 1, further comprising the steps of: moving to a parallel key by the steps of:

rotating the third and sixth bodies of the sequence ninety degrees away from the user.

* * * * *